Oct. 6, 1931.        T. P. CHASE         1,826,381
                      BRAKE DRUM
                  Filed Dec. 31, 1928

Inventor
Theron P. Chase

Patented Oct. 6, 1931

1,826,381

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

BRAKE DRUM

Application filed December 31, 1928. Serial No. 329,435.

This invention relates to brakes, and particularly to brake drums for use with shoes or bands, as on vehicle wheels and elsewhere.

An object of the invention is to produce an improved brake drum having good heat-radiating characteristics, and one resisting wear from the frictional engagement of the shoe to a high degree. Convenience in assembly and economy are among the secondary objects to be obtained.

Figure 1:
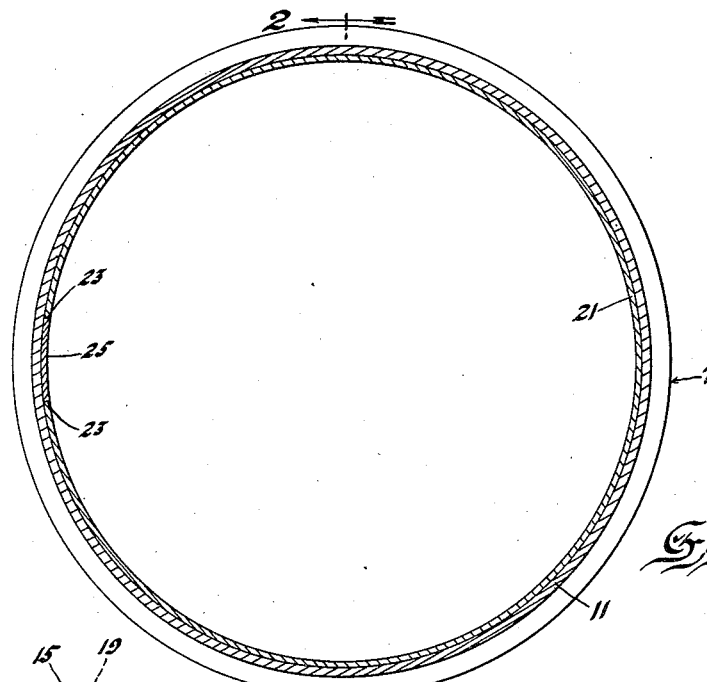
Figure 2:
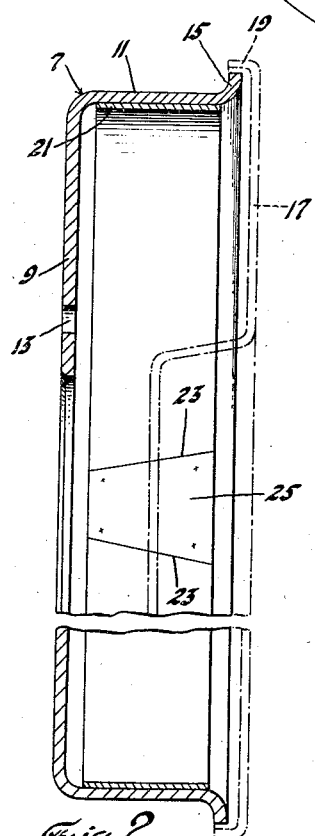

The invention to be described is illustrated in the accompanying drawings wherein Figure 1 is a section through a brake drum constructed in accordance with this invention;

Figure 2 is a section on line 2—2 of Figure 1;

Figures 3 to 6, inclusive, are sectional details of four modified forms.

Referring by reference characters to the drawings, numeral 7 represents a brake drum having a head 9 and a flange 11. The head 9 has openings, one of which is shown at 13 on Figure 2 for the reception of fastening means by which the drum may be secured to the vehicle wheels, or other member, the rotation of which is to be checked. The flange 11 may terminate in a radially directed flange 15.

When used on wheels the opening of the drum is usually closed by a fixed or backing plate. Such a plate is represented by numeral 17. It may be shaped as the conditions require. It is preferably provided with a terminal or axial flange 19 cooperating with the flange 15 to form an annular gap opening in such a direction as to prevent entrance of foreign matter.

The drum described may be made of low carbon steel, and its flange 15 serves to stiffen the brake drum and prevent distortion.

Within the drum flange is a band 21 of high carbon or other alloy steel. This band has high wear-resisting characteristics. It is this band which is to be frictionally engaged by the brake member, the shoe or the band, as the case may be. This brake member is relatively fixed and by its frictional engagement serves to retard the rotary motion of the drum.

In accordance with one feature of this invention, instead of making the band continuous, as by rolling it into circular form and then welding the adjacent ends, I may prefer to use a split band with its adjacent ends 23 somewhat spaced from each other and angularly related, as shown in Figure 2.

An insert of substantially trapezoidal shape 25 may be driven into position between these adjacent ends. When the insert is inserted in position it may be welded to the drum. The wear-resisting liner is then held securely in position. If the band is in the form of a continuous ring, it may be secured by welding to the drum, as indicated in Figures 3, 4, 5 and 6. Such welding may also be adopted additionally to the attachment by the wedge when that method of securing the band is used.

Figure 3:
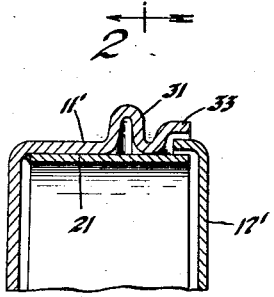

Figure 3 shows the axial flange 11' provided with a radial flange 31. This flange 31 is made, as shown, by providing a double bend whereby a double-thickness radial flange is formed which serves materially to stiffen the drum and also functions to aid in radiating heat. From the radial flange 31 the material of flange 11' may be bent radially and then outwardly as at 33 where it surrounds the axial flange on the backing plate 17'.

Figure 4:
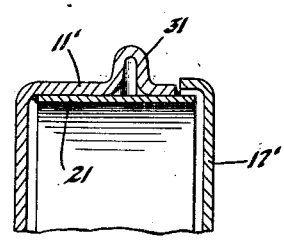

Figure 4 shows a somewhat similar construction. In this form the flange 11' is formed with the radial flange 31, as before, but the part 33 is omitted and the extreme end of the flange 11' closely adjoins the axial flange of the backing plate 17'.

Figure 5:
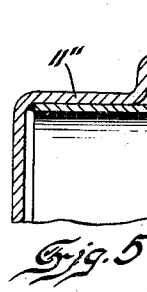

Figure 5 is quite similar to Figure 4. In this figure the drum flange 11" has the radial flange 31' nearer the backing plate 17' than in Figure 4. The flange 11" has no extension beyond the base of the radial flange 31'.

Figure 6:
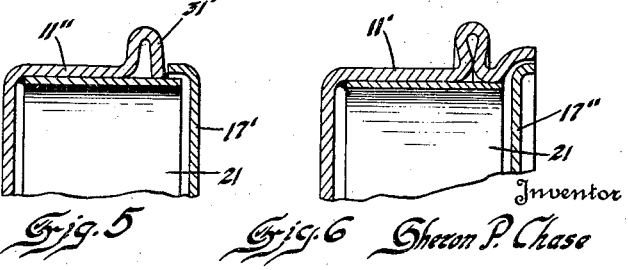

In Figure 6 the flange 11' is substantially like that in Figure 3. In this figure the backing plate 17" is shown with its terminal axial flange arranged in a reverse direction. In this case, the annular gap between the axial flanges faces in the opposite direction from that shown in Figure 2, for example.

In all these forms, Figures 3, 4, 5 and 6, the drum flange is stiffened by the provision of the radial flange formed by bending the drum flange into a double-thickness, radial extension. Obviously other methods of providing for stiffening and cooling might be adopted. In each of these forms the drum is preferably made of low carbon steel and a high carbon wear-resisting liner is shown, as in Figure 2.

I claim:

1. In combination, a brake drum, a wear-resisting liner therefor, said liner having adjacent angularly related ends, and an angular plate member located between said ends and spreading said liner against the drum periphery.

2. The invention set forth in claim 1, said plate member being trapezoidal in shape and welded to said drum.

3. In combination, a brake drum of low carbon steel, a liner therefor of high carbon steel, said liner of a single length of material bent into circular form with its ends out of parallelism, and means located between said ends to spread said liner into contact with said drum.

4. In combination, a brake drum of low carbon steel, a liner of high carbon steel, said liner in the form of a split ring, its adjacent ends being in divergent relation throughout the transverse extent of said liner, a trapezoidal plate positioned between said ends and spreading said liner into contact with the drum, said plate being rigidly secured to said drum.

5. A brake drum having an axial flange, said flange being folded to provide a double-thickness, radial flange, whereby the drum is reinforced.

6. A brake drum having an axial flange, said flange being folded to provide a double thickness radial flange whereby the drum is reinforced, said drum being formed of low carbon steel and a liner in said drum of high carbon steel.

In testimony whereof I affix my signature.

THERON P. CHASE.